United States Patent
Petrucha et al.

(10) Patent No.: US 12,388,100 B2
(45) Date of Patent: Aug. 12, 2025

(54) FUEL CELL SYSTEM INCLUDING CATALYST RING ANODE TAIL GAS OXIDIZER

(71) Applicant: BLOOM ENERGY CORPORATION, San Jose, CA (US)

(72) Inventors: Michael Petrucha, Santa Clara, CA (US); John Fisher, Spokane, WA (US); Nilanjana Basu, Santa Clara, CA (US); Martin Perry, Mountain View, CA (US); Srikanth Ranganathan, San Jose, CA (US); Victor Silva, Denver, CO (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 744 days.

(21) Appl. No.: 17/655,289

(22) Filed: Mar. 17, 2022

(65) Prior Publication Data

US 2023/0142906 A1 May 11, 2023

Related U.S. Application Data

(60) Provisional application No. 63/278,421, filed on Nov. 11, 2021.

(51) Int. Cl.
| | |
|---|---|
| *H01M 8/04* | (2016.01) |
| *H01M 8/04089* | (2016.01) |
| *H01M 8/04746* | (2016.01) |
| *H01M 8/0656* | (2016.01) |

(52) U.S. Cl.
CPC ..... *H01M 8/0656* (2013.01); *H01M 8/04097* (2013.01); *H01M 8/04761* (2013.01)

(58) Field of Classification Search
CPC .......... H01M 8/0656; H01M 8/04097; H01M 8/04761
See application file for complete search history.

(56) References Cited

U.S. PATENT DOCUMENTS

| | | |
|---|---|---|
| 8,563,180 B2 | 10/2013 | Perry et al. |
| 8,877,399 B2 | 11/2014 | Weingaertner et al. |
| 8,968,943 B2 | 3/2015 | Perry et al. |
| 9,190,673 B2 | 11/2015 | Venkataraman et al. |
| 9,520,602 B2 | 12/2016 | Venkataraman et al. |
| 9,780,392 B2 | 10/2017 | Perry et al. |

(Continued)

FOREIGN PATENT DOCUMENTS

WO  WO 2008/131078 A1  10/2008

OTHER PUBLICATIONS

China National Intellectual Property Administration ("CNIPA"), First Rectification Notification for PRC (China) Patent Application No. 202222926212.5, mailed Feb. 2, 2023, 1 page.

(Continued)

*Primary Examiner* — Olatunji A Godo
(74) *Attorney, Agent, or Firm* — THE MARBURY LAW GROUP PLLC

(57) ABSTRACT

A fuel cell system anode tail gas oxidizer (ATO) includes an inner ATO wall, an outer ATO wall, and a first catalyst ring disposed in a chamber formed between the inner ATO wall and the outer ATO wall. The first catalyst ring includes an inner wall, an outer wall, and a matrix disposed between the inner wall and the outer wall and loaded with an oxidation catalyst.

21 Claims, 9 Drawing Sheets

(56) References Cited

U.S. PATENT DOCUMENTS

| | | |
|---|---|---|
| 9,941,525 B2 | 4/2018 | Perry et al. |
| 9,991,526 B2 | 6/2018 | Perry et al. |
| 10,797,327 B2 | 10/2020 | Perry et al. |
| 10,957,921 B2 | 3/2021 | Weingaertner et al. |
| 11,001,915 B1 | 5/2021 | Ashary |
| 11,196,068 B2 | 12/2021 | Weingaertner et al. |
| 2009/0208784 A1* | 8/2009 | Perry .................. H01M 8/0618 429/411 |
| 2010/0221620 A1* | 9/2010 | Muta ................ H01M 8/04701 429/434 |
| 2011/0053027 A1 | 3/2011 | Weingaertner et al. |
| 2012/0178003 A1 | 7/2012 | Venkataraman et al. |
| 2012/0196195 A1 | 8/2012 | Perry et al. |
| 2014/0178786 A1 | 6/2014 | Perry et al. |
| 2015/0140457 A1 | 5/2015 | Perry et al. |
| 2016/0064748 A1 | 3/2016 | Venkataraman et al. |
| 2016/0233529 A1 | 8/2016 | Perry et al. |
| 2018/0191007 A1 | 7/2018 | Perry et al. |
| 2019/0081334 A1 | 3/2019 | Patel et al. |
| 2020/0168922 A1 | 5/2020 | Weingaertner et al. |
| 2020/0243885 A1 | 7/2020 | Weingaertner et al. |
| 2021/0020967 A1 | 1/2021 | Edmonston et al. |
| 2021/0328238 A1 | 10/2021 | Cedarleaf-Pavy et al. |

OTHER PUBLICATIONS

European Extended Search Report For European Patent Application 22205264.9, mailed Apr. 20, 2023, 7 pages.

\* cited by examiner

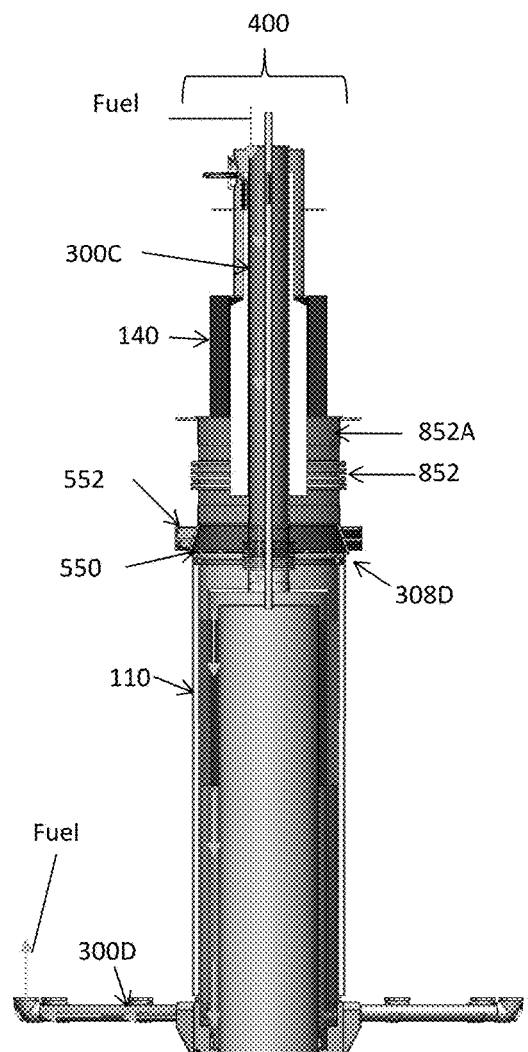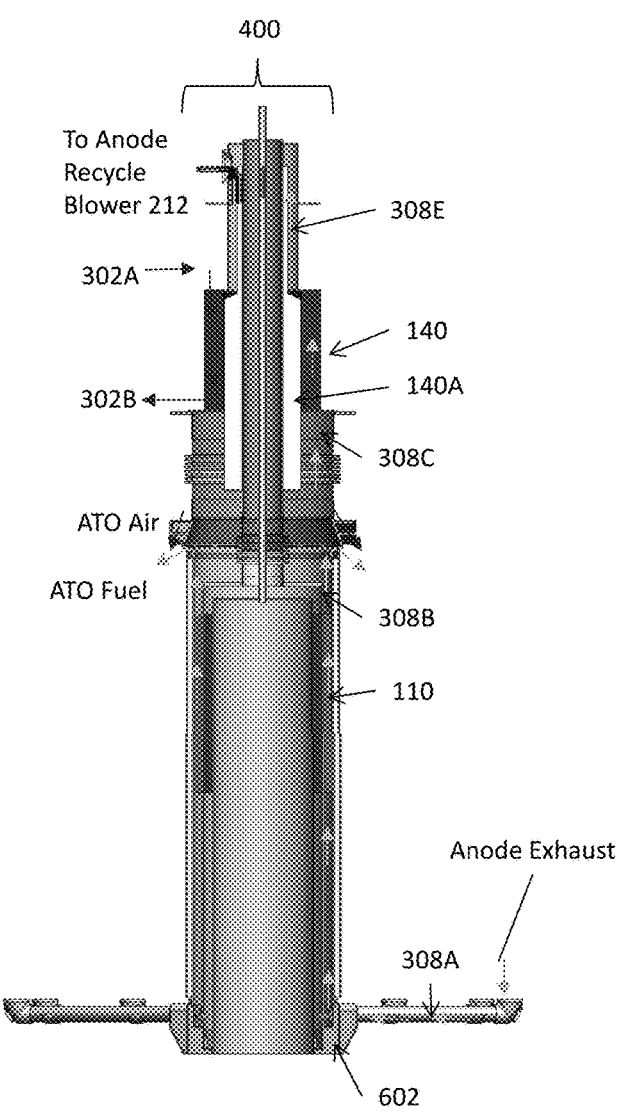
FIG. 3A
FIG. 3B
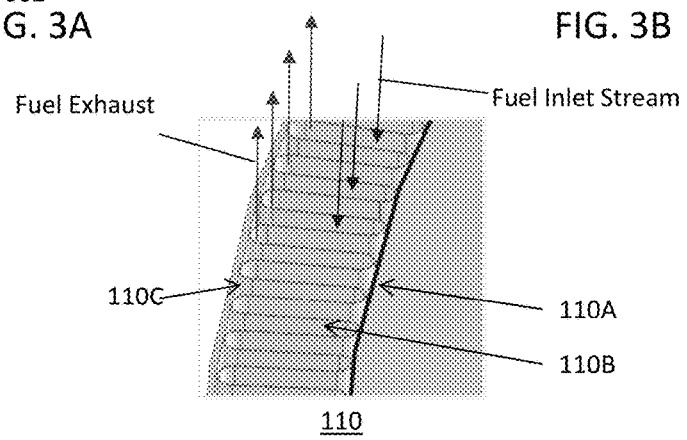
FIG. 3C

FUEL CELL SYSTEM INCLUDING CATALYST RING ANODE TAIL GAS OXIDIZER

FIELD

Aspects of the present invention relate to fuel cell systems, and more particularly, to fuel cell systems including a catalyst ring anode tail gas oxidizer (ATO).

BACKGROUND

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

According to various embodiments, provided is a fuel cell system anode tail gas oxidizer (ATO) comprising: an inner ATO wall; an outer ATO wall; and a first catalyst ring disposed in a chamber formed between the inner ATO wall and the outer ATO wall, the first catalyst ring comprising: an inner wall; an outer wall; and a matrix disposed between the inner wall and the outer wall and loaded with an oxidation catalyst.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIGS. 3A-3C are sectional views showing fuel and air flow through the central column of the system of FIG. 2A, according to various embodiments of the present disclosure.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In a solid oxide fuel cell (SOFC) system, a fuel inlet stream may be humidified in order to facilitate fuel reformation reactions such as steam reformation and water-gas shift reactions. In addition, during system startup, shutdown, and power grid interruption events, water may be added to a fuel inlet stream in order to prevent coking of system components such as catalysts. Conventionally, such humidification is performed by vaporizing water in a steam generator containing corrugated tubing. Water flows through the corrugated tubing and is heated by the cathode recuperator heat exchanger exhaust stream which flows around the outside of the tubing. However, utilizing relatively low-temperature cathode recuperator exhaust stream generally requires substantial lengths of corrugated tubing, in order to absorb enough heat to vaporize the water. Further, the steam generator is relative large and bulky, which also adds to the system size, complexity and manufacturing costs.

In contrast, embodiments of the present disclosure provide a water injector configured to inject water directly into the anode exhaust recycle stream which provides heat to vaporize the water into steam and/or aerosolize the water into droplets small enough to be entrained in the anode exhaust stream. The anode exhaust recycle stream is recycled into the fuel inlet stream provided into the fuel cell stack, such that humidified fuel is provided to the fuel cells of the fuel cell stack. Thus, the prior art steam generator may be omitted to reduce system size, complexity and cost. In addition, the embodiment system may operate using relatively short, non-corrugated water conduit, which may improve system response times and reduce system size and cost.

Figure 1:
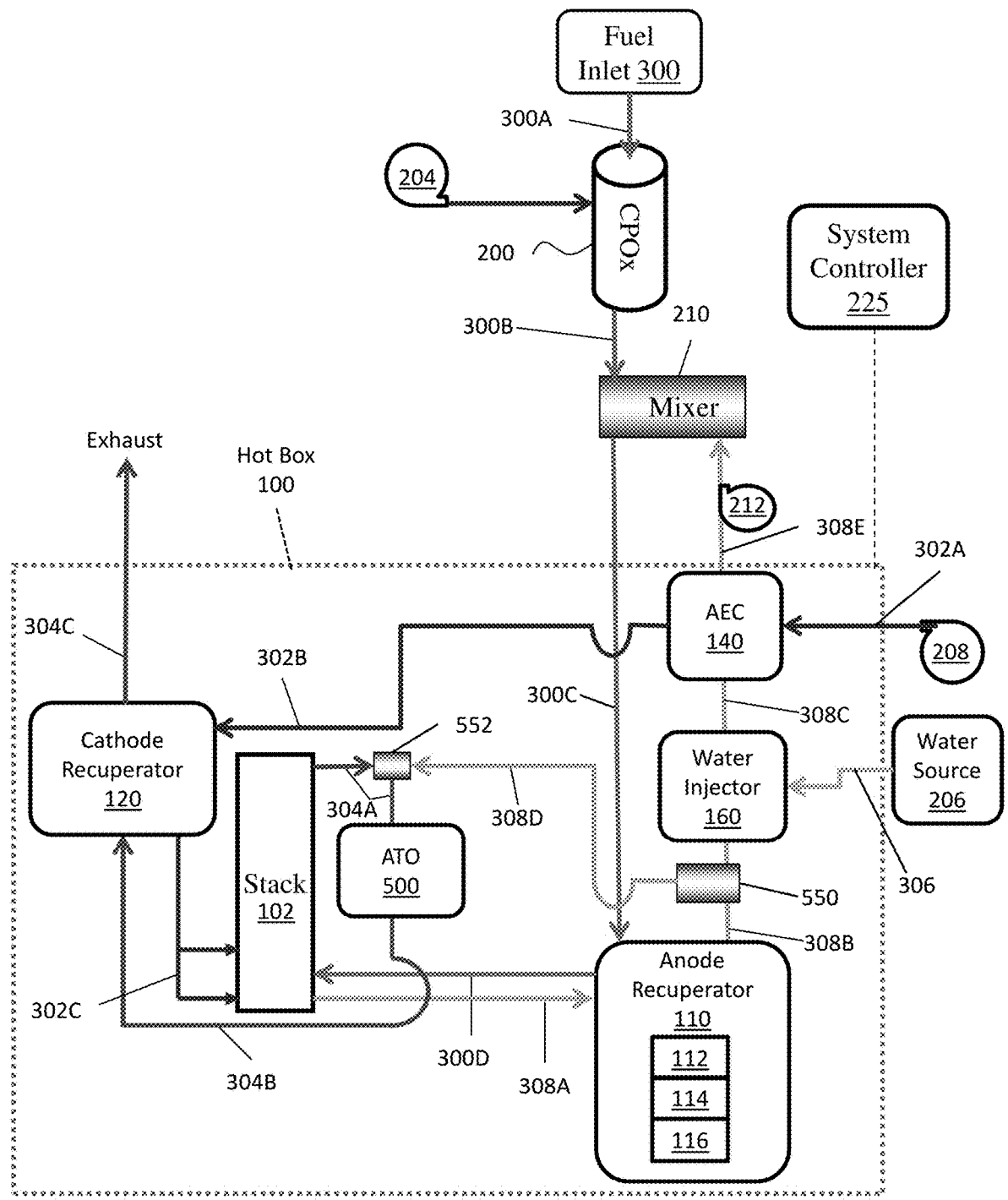
FIG. 1 is a schematic of a fuel cell system, according to various embodiments of the present disclosure.

FIG. 1 is a schematic representation of a SOFC system 10, according to various embodiments of the present disclosure. Referring to FIG. 1, the system 10 includes a hotbox 100 and various components disposed therein or adjacent thereto. The hot box 100 may contain fuel cell stacks 102, such as a solid oxide fuel cell stacks containing alternating fuel cells and interconnects. One solid oxide fuel cell of the stack contains a ceramic electrolyte, such as yttria stabilized zirconia (YSZ), scandia stabilized zirconia (SSZ), scandia and ceria stabilized zirconia or scandia, yttria and ceria stabilized zirconia, an anode electrode, such as a nickel-YSZ, a nickel-SSZ or nickel-doped ceria cermet, and a cathode electrode, such as lanthanum strontium manganite (LSM). The interconnects may be metal alloy interconnects, such as chromium-iron alloy interconnects. The stacks 102 may be arranged over each other in a plurality of columns.

The hot box 100 may also contain an anode recuperator heat exchanger 110, a cathode recuperator heat exchanger 120, an anode tail gas oxidizer (ATO) 500, an anode exhaust cooler heat exchanger 140, a splitter 550, a vortex generator 552, and a water injector 160. The system 10 may also include a catalytic partial oxidation (CPOx) reactor 200, a mixer 210, a CPOx blower 204 (e.g., air blower), a system blower 208 (e.g., air blower), and an anode recycle blower 212, which may be disposed outside of the hotbox 100. However, the present disclosure is not limited to any particular location for each of the components with respect to the hotbox 100.

The CPOx reactor 200 receives a fuel inlet stream from a fuel inlet 300, through fuel conduit 300A. The fuel inlet 300 may be a fuel tank or a utility natural gas line including a valve to control an amount of fuel provided to the CPOx reactor 200. The CPOx blower 204 may provide air to the CPOx reactor 202 during system start-up. The fuel and/or air may be provided to the mixer 210 by fuel conduit 300B. Fuel (e.g., the fuel inlet stream 1721 described below with respect to FIGS. 4A-4C) flows from the mixer 210 to the anode recuperator 110 through fuel conduit 300C. The fuel is heated in the anode recuperator 110 by a portion of the fuel exhaust and the fuel then flows from the anode recuperator 110 to the stack 102 through fuel conduit 300D.

The system blower 208 may be configured to provide an air stream (e.g., air inlet stream) to the anode exhaust cooler 140 through air conduit 302A. Air flows from the anode exhaust cooler 140 to the cathode recuperator 120 through air conduit 302B. The air is heated by the ATO exhaust in the cathode recuperator 120. The air flows from the cathode recuperator 120 to the stack 102 through air conduit 302C.

An anode exhaust stream (e.g., the fuel exhaust stream described below with respect to FIGS. 3A-3C) generated in the stack 102 is provided to the anode recuperator 110 through anode exhaust conduit 308A. The anode exhaust may contain unreacted fuel and may also be referred to herein as fuel exhaust. The anode exhaust may be provided from the anode recuperator 110 to the splitter 550 by anode exhaust conduit 308B. A first portion of the anode exhaust may be provided from the splitter 550 to the anode exhaust cooler 140 through the water injector 160 and the anode exhaust conduit 308C. A second portion of the anode exhaust is provided from the splitter 550 to the ATO 500 through the anode exhaust conduit 308D. The first portion of the anode exhaust heats the air inlet stream in the anode exhaust cooler 140 and may then be provided from the anode exhaust cooler 140 to the mixer 210 through the anode exhaust conduit 308E. The anode recycle blower 212 may be configured to move anode exhaust though anode exhaust conduit 308E, as discussed below.

Cathode exhaust generated in the stack 102 flows to the ATO 500 through exhaust conduit 304A. The vortex generator 552 may be disposed in exhaust conduit 304A and may be configured to swirl the cathode exhaust. The anode exhaust conduit 308D may be fluidly connected to the vortex generator 552 or to the cathode exhaust conduit 304A or the ATO 500 downstream of the vortex generator 552. The swirled cathode exhaust may mix with the second portion of the anode exhaust provided by the splitter 550 before being provided to the ATO 500. The mixture may be oxidized in the ATO 500 to generate an ATO exhaust. The ATO exhaust flows from the ATO 500 to the cathode recuperator 120 through exhaust conduit 304B. Exhaust flows from the cathode recuperator and out of the hotbox 100 through exhaust conduit 304C.

Water flows from a water source 206, such as a water tank or a water pipe, to the water injector 160 through water conduit 306. The water injector 160 injects water directly into first portion of the anode exhaust provided in conduit 308C. Heat from the first portion of the anode exhaust (also referred to as a recycled anode exhaust stream) provided in exhaust conduit 308C vaporizes the water to generate steam. The steam mixes with the anode exhaust, and the resultant mixture is provided to the anode exhaust cooler 140. The mixture is then provided from the anode exhaust cooler 140 to the mixer 210 through the anode exhaust conduit 308E. The mixer 210 is configured to mix the steam and first portion of the anode exhaust with fresh fuel (i.e., fuel inlet stream). This humidified fuel mixture may then be heated in the anode recuperator 110 by the anode exhaust, before being provided to the stack 102. The system 10 may also include one or more fuel reforming catalysts 112, 114, and 116 located inside and/or downstream of the anode recuperator 100. The reforming catalyst(s) reform the humidified fuel mixture before it is provided to the stack 102.

The system 10 may further a system controller 225 configured to control various elements of the system 10. The controller 225 may include a central processing unit configured to execute stored instructions. For example, the controller 225 may be configured to control fuel and/or air flow through the system 10, according to fuel composition data.

Figures 2A, 2B:
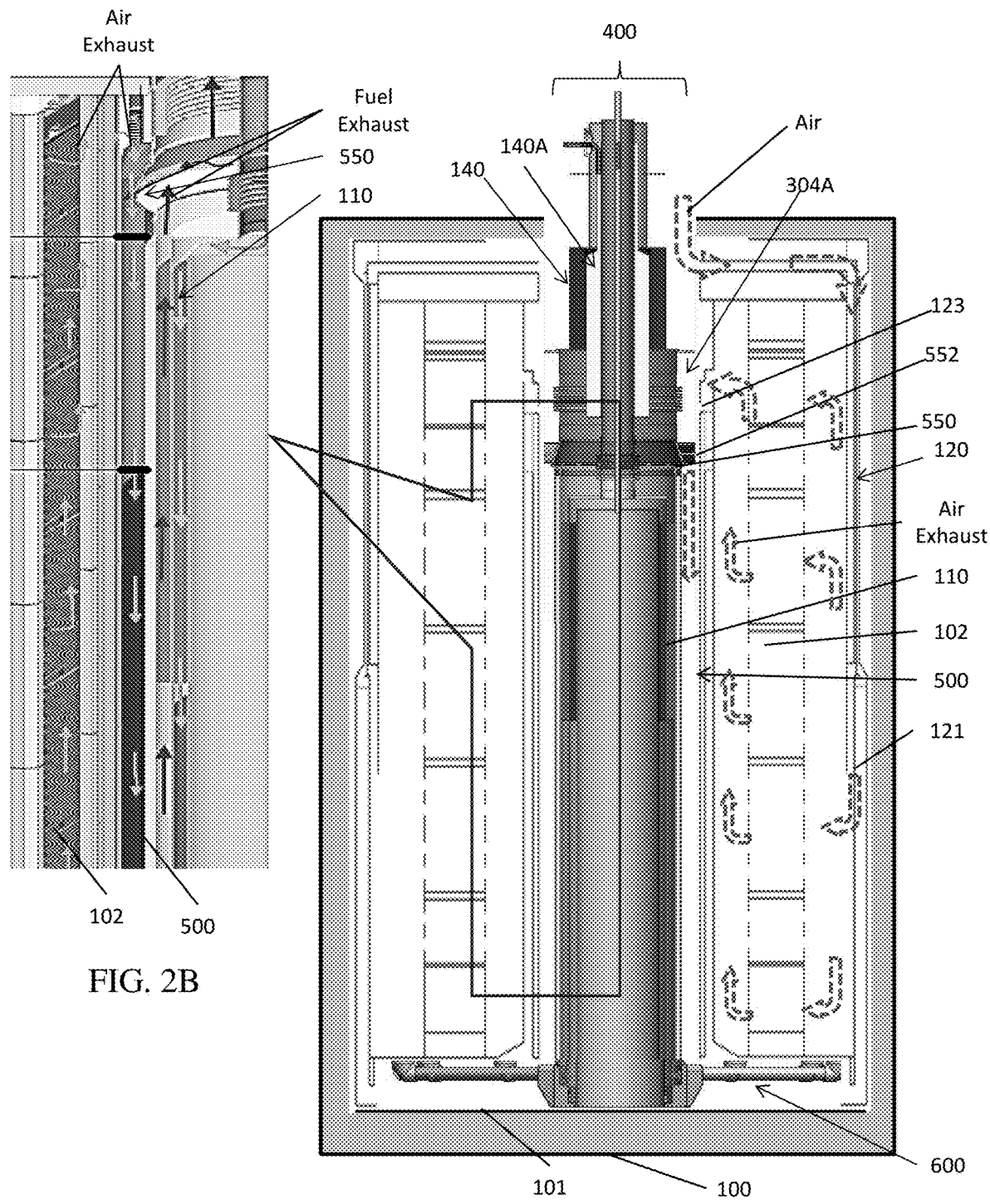
FIG. 2A is a sectional view showing components of the hot box of the system of FIG. 1.
FIG. 2B shows an enlarged portion of the system of FIG. 2A.
Figure 2C:
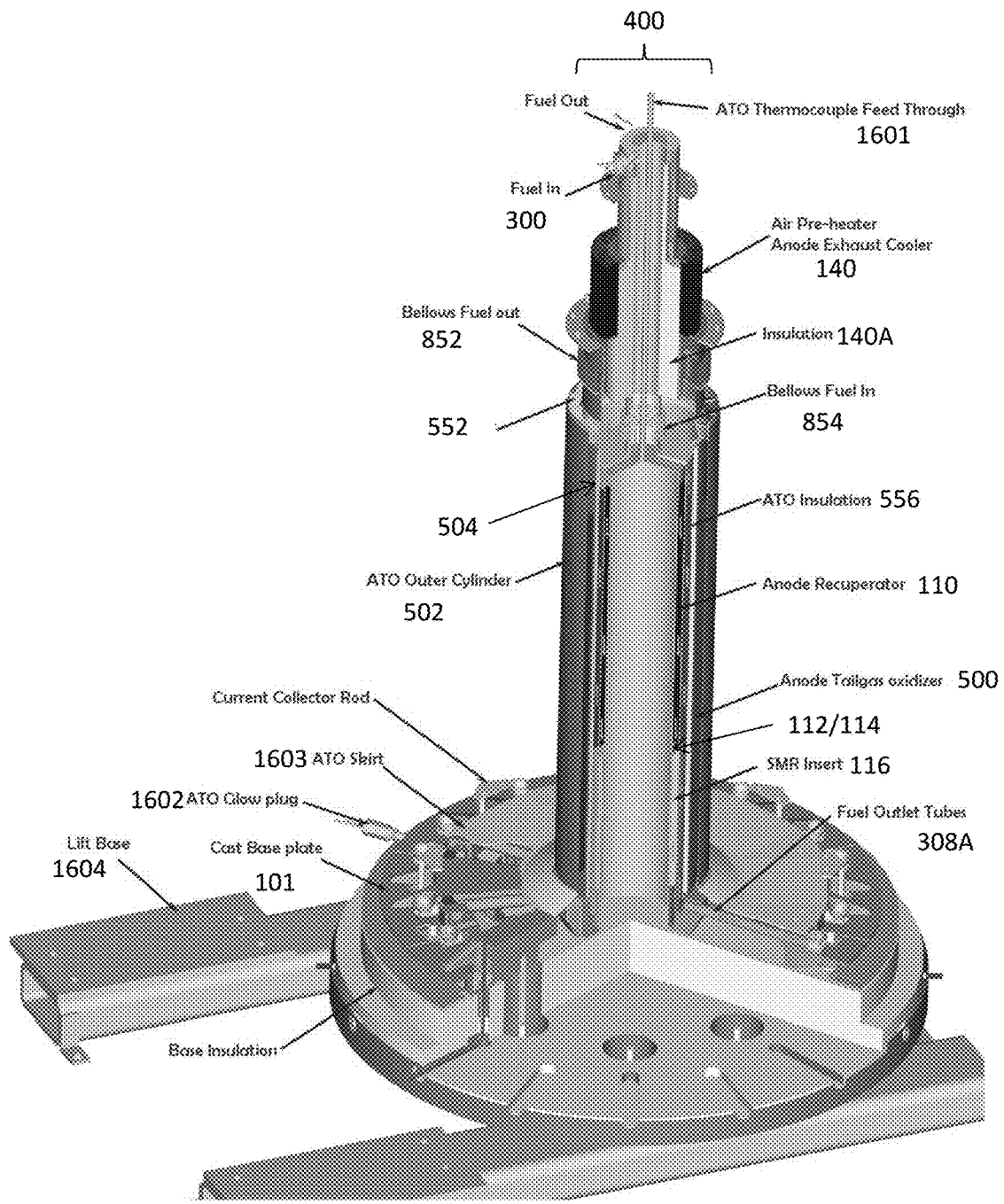
FIG. 2C is a three dimensional cut-away view of a central column of the system of FIG. 2A.
Figure 2D:
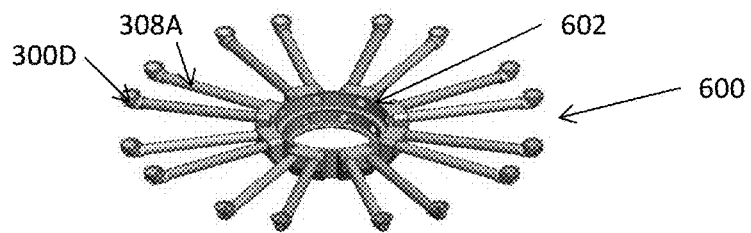
FIG. 2D is a perspective view of an anode hub structure disposed below the central column of the system of FIG. 2A, according to various embodiments of the present disclosure.

FIG. 2A is a sectional view showing components of the hot box 100 of the system 10 of FIG. 1, and FIG. 2B shows an enlarged portion of FIG. 2A. FIG. 2C is a three dimensional cut-away view of a central column 400 of the system 10, according to various embodiments of the present disclosure, and FIG. 2D is a perspective view of an anode hub structure 600 disposed in a hot box base 101 on which the column 400 may be disposed.

Referring to FIGS. 2A-2D, the fuel cell stacks 102 may be disposed around the central column 400 in the hot box 100. For example, the stacks 102 may be disposed in a ring configuration around the central column 400 and may be positioned on the hot box base 101. The column 400 may include the anode recuperator 110, the ATO 500, and the anode exhaust cooler 140. In particular, the anode recuperator 110 is disposed radially inward of the ATO 500, and the anode exhaust cooler 140 is mounted over the anode recuperator 110 and the ATO 500. In one embodiment, an oxidation catalyst 112 and/or the hydrogenation catalyst 114 may be located in the anode recuperator 110. A reforming catalyst 116 may also be located at the bottom of the anode recuperator 110 as a steam methane reformation (SMR) insert.

The ATO 500 comprises an outer cylinder 502 that is positioned around inner ATO insulation 556/outer wall of the anode recuperator 110. Optionally, the insulation 556 may be enclosed by an ATO inner cylinder 504. Thus, the insulation 556 may be located between the anode recuperator 110 and the ATO 500. An ATO oxidation catalyst may be located in the space between the outer cylinder 502 and the ATO insulation 556. A fuel inlet path bellows 854 may be located between the anode exhaust cooler 140 and the inner ATO cylinder 504. An ATO thermocouple feed through 1601 extends through the anode exhaust cooler 140, to the top of the ATO 500. The temperature of the ATO 500 may thereby be monitored by inserting one or more thermocouples (not shown) through this feed through 1601.

The anode hub structure 600 may be positioned under the anode recuperator 110 and ATO 500 and over the hot box base 101. The anode hub structure 600 is covered by an ATO skirt 1603. The vortex generator 552 and fuel exhaust splitter 550 are located over the anode recuperator 110 and ATO 500 and below the anode exhaust cooler 140. An ATO glow plug 1602, which initiates the oxidation of the stack fuel exhaust in the ATO during startup, may be located near the bottom of the ATO 500.

The anode hub structure 600 is used to distribute fuel evenly from the central column to fuel cell stacks 102 disposed around the central column 400. The anode flow hub structure 600 includes a grooved cast base 602 and a "spider" hub of fuel inlet conduits 300D and outlet conduits 308A. Each pair of conduits 300D, 308A connects to a fuel cell stack 102. Anode side cylinders (e.g., anode recuperator 110 inner and outer cylinders and ATO outer cylinder 502) are then welded or brazed into the grooves in the base 602, creating a uniform volume cross section for flow distribution as discussed below.

A lift base 1604 is located under the hot box base 101, as illustrated in FIG. 2C. In an embodiment, the lift base 1604 includes two hollow arms with which the forks of a fork lift can be inserted to lift and move the system, such as to remove the system from a cabinet (not shown) for repair or servicing.

As shown by the arrows in FIGS. 2A and 2B, air enters the top of the hot box 100 and then flows into the cathode recuperator 120 where it is heated by ATO exhaust (not shown) from the ATO 500. The heated air then flows inside the cathode recuperator 120 through a first vent or opening 121. The air then flows through the stacks 102 and reacts with fuel (i.e., fuel inlet stream) provided from the anode hub structure 600. Air exhaust flows from the stacks 102, through a second vent or opening 123. The air exhaust then passes through vanes of the vortex generator 552 and is swirled before entering the ATO 500.

The splitter 550 may direct the second portion of the fuel exhaust exiting the top of the anode recuperator 100 through openings (e.g., slits) in the splitter into the swirled air exhaust (e.g., in the vortex generator 552 or downstream of the vortex generator in conduit 304A or in the ATO 500). At such the fuel and air exhaust may be mixed before entering the ATO 500.

FIGS. 3A and 3B are side cross-sectional views showing flow distribution through the central column 400, and 3C is top cross-sectional view taken through the anode recuperator 110. Referring to FIGS. 2A, 2B, 3A, and 3C, the anode recuperator 110 includes an inner cylinder 110A, a corrugated plate 110B, and an outer cylinder 110C that may be coated with the ATO insulation 556. Fuel from fuel conduit 300C enters the top of the central column 400. The fuel then bypasses the anode exhaust cooler 140 by flowing through its hollow core and then flows through the anode recuperator 110, between the outer cylinder 110C and the and the corrugated plate 110B. The fuel then flows through the hub base 602 and conduits 300D of the anode hub structure 600 shown in FIG. 3B, to the stacks 102.

Referring to FIGS. 2A, 2B, 2C, 3A, and 3B, the fuel exhaust flows from the stacks 102 through conduits 308A into the hub base 602, and from the hub base 602 through the anode recuperator 110, between in inner cylinder 110A and the corrugated plate 110B, and through conduit 308B into the splitter 550. The first portion of the fuel exhaust flows from the splitter 550 to the anode exhaust cooler 140 through conduit 308C, while the second portion flows from the splitter 550 to the ATO 500 through conduit 308D, as shown in FIG. 1. Anode exhaust cooler inner core insulation 140A may be located between the fuel conduit 300C and bellows 852/supporting cylinder 852A located between the anode exhaust cooler 140 and the vortex generator 552, as shown in FIG. 3A. This insulation minimizes heat transfer and loss from the first portion of the anode exhaust stream in conduit 308C on the way to the anode exhaust cooler 140. Insulation 140A may also be located between conduit 300C and the anode exhaust cooler 140 to avoid heat transfer between the fuel inlet stream in conduit 300C and the streams in the anode exhaust cooler 140. In other embodiments, insulation 140A may be omitted from inside the cylindrical anode exhaust cooler 140.

FIG. 3B also shows air flowing from the air conduit 302A to the anode exhaust cooler 140 (where it is heated by the first portion of the anode exhaust) and then from the anode exhaust cooler 140 through conduit 302B to the cathode recuperator 120. The first portion of the anode exhaust is cooled in the anode exhaust cooler 140 by the air flowing through the anode exhaust cooler 140. The cooled first portion of the anode exhaust is then provided from the anode exhaust cooler 140 to the anode recycle blower 212 shown in FIG. 1.

As will be described in more detail below and as shown in FIGS. 2A and 3B, the anode exhaust exits the anode recuperator 110 and is provided into splitter 550 through conduit 308B. The splitter 550 splits the anode exhaust into first and second anode exhaust portions (i.e., streams). The first stream is provided into the anode exhaust cooler 140 through conduit 308C. The second stream is provided to the ATO 500 through conduit 308D.

The relative amounts of anode exhaust provided to the ATO 500 and the anode exhaust cooler 140 is controlled by the anode recycle blower 212. The higher the blower 212 speed, the larger portion of the anode exhaust is provided into conduit 308C and a smaller portion of the anode exhaust is provided to the ATO 500 via conduit 308D, and vice-versa.

The anode exhaust provided to the ATO 500 is not cooled in the anode exhaust cooler 140. This allows higher temperature anode exhaust to be provided into the ATO 500 than if the anode exhaust were provided after flowing through the anode exhaust cooler 140. For example, the anode exhaust provided into the ATO 500 from the splitter 550 may have a temperature of above 350° C., such as from about 350 to about 500° C., for example, from about 375 to about 425° C., or from about 390 to about 410° C. Furthermore, since a smaller amount of anode exhaust is provided into the anode exhaust cooler 140 (e.g., not 100% of the anode exhaust is provided into the anode exhaust cooler due to the splitting of the anode exhaust in splitter 550), the heat exchange area of the anode exhaust cooler 140 may be reduced. The anode exhaust provided to the ATO 500 may be oxidized by the stack cathode (i.e., air) exhaust and provided to the cathode recuperator 120 through conduit 304B.

Figure 4:
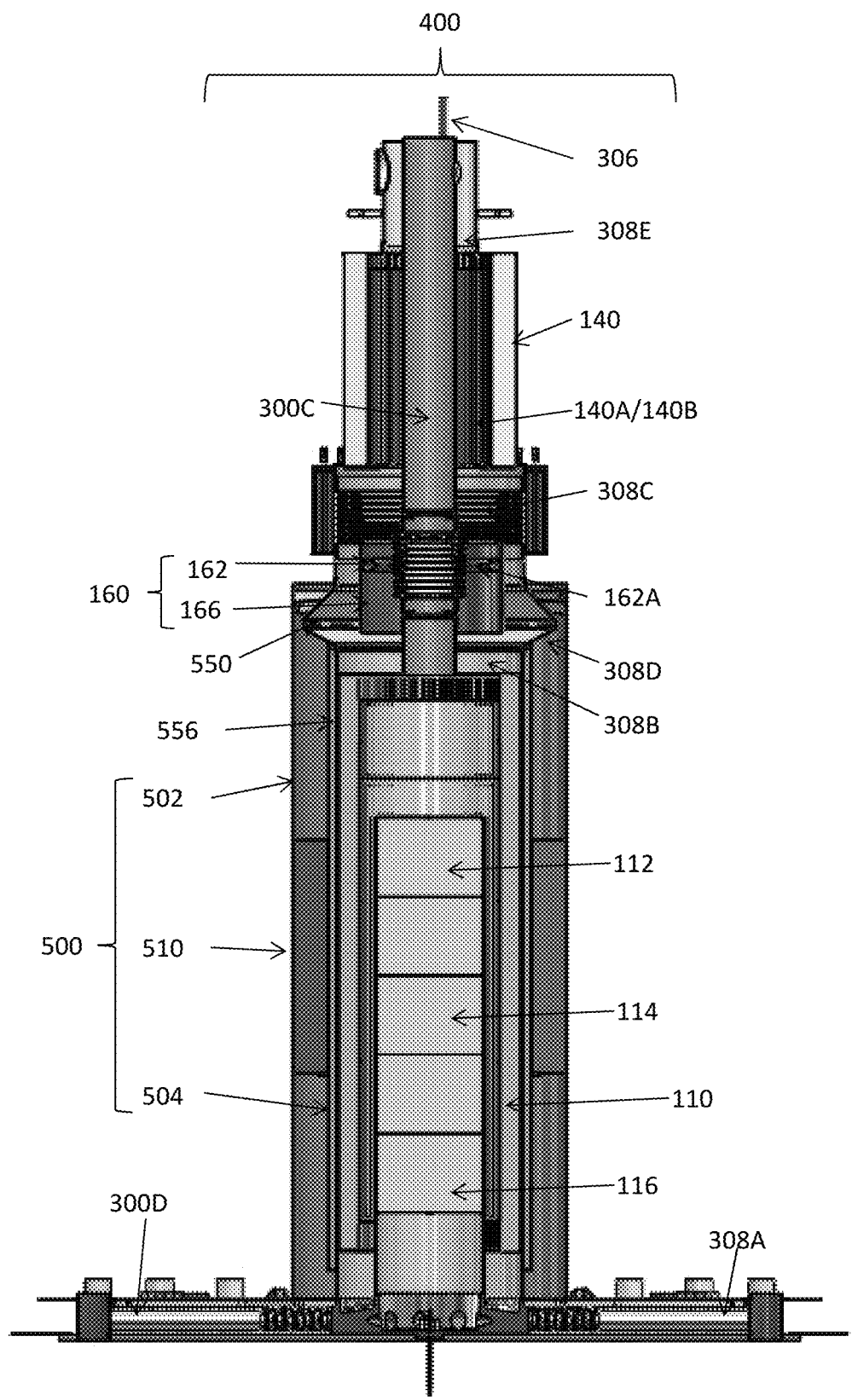
FIG. 4 is a partial perspective view of the central column of the system of FIG. 2A, according to various embodiments of the present disclosure.

FIG. 4 is a sectional perspective view showing the water injector 160 and ATO 500 in the central column of FIG. 2A. Referring to FIG. 4, the splitter 550 comprises the horizontal slits shown in FIG. 3A. However, in other embodiments, the splitter 550 may comprise tubes that extend through the outer wall of the anode exhaust conduit 308B rather than the slits.

The water injector 160 may include and injector ring 162 and a shroud 166. The injector ring 162 may be disposed inside the anode exhaust conduit 308C between the anode exhaust cooler 140 and the anode recuperator 110 and may be fluidly connected to the water conduit 306. The injector ring 162 is a tube that extends around the fuel conduit 300C. The injector ring 162 may include injection apertures (i.e., openings) 162A configured to inject water directly into the first portion of the anode exhaust flowing in the conduit 308C from the splitter 550 and anode recuperator 110. The water may be vaporized by the hot first portion of the anode exhaust. The injection apertures 162A may be configured to generate streams or droplets of water, which may be vaporized instantaneously or within seconds of emerging from the injector ring 162. The injector ring 162 may also be sized to provide substantially uniform circumferential flow of water therein and to minimize a pressure drop in the anode exhaust flowing thereby.

The shroud 166 may be a cylinder which surrounds the injector ring 162. The shroud 166 may be configured to segregate the water from the second portion of the anode exhaust flowing into the ATO 500 through the splitter 550. In particular, the second portion of the anode exhaust flowing outside of the shroud 166 may be directed by the splitter 550 radially outward toward the anode exhaust conduit 308D and the ATO 500, while the first portion of the anode exhaust flowing inside of the shroud 166 is directed upward by the splitter 550 toward the injector ring 162 in the anode exhaust conduit 308C. Accordingly, the shroud 166 may be configured to prevent or reduce the amount of water and/or the first portion of the anode exhaust that has been humidified by the injected water from being injected into the ATO 500 by the splitter 550. In other words, the shroud 166 is configured such that substantially all of the water and the humidified first portion of the anode exhaust are directed towards the anode exhaust cooler 140.

The ATO 500 may surround the anode recuperator 110, and the catalysts 112, 114 and 116 may be disposed inside the inner plenum which is surrounded by the anode recuperator 110, similar to the configuration described in U.S. Pat. No. 9,287,572 B2, issued Mar. 15, 2016 and incorporated herein by reference in its entirety.

The ATO 500 may include a catalyst ring 510 disposed in an annular chamber formed between the outer cylinder 502 and the inner cylinder 504. In particular, the catalyst ring 510 may be disposed at a distance from the splitter 550 that is sufficient for a majority of the oxidation of fuel exhaust to occur prior to the exhaust entering the catalyst ring 510. In other words, the distance may be set such that un-catalyzed oxidation of the exhaust, such as the oxidation of hydrogen to form water and/or oxidation of carbon monoxide to form carbon dioxide, may be complete or more than 50% complete, before the exhaust enters the catalyst ring 510.

The catalyst ring 510 may be configured to catalyze the oxidation of oxidizable species that remain in the catalyst exhaust after the un-catalyzed oxidation. For example, the catalyst ring 510 may include a catalyst or mixture of catalysts configured to catalyze the oxidation of carbon monoxide and/or fuel (e.g., hydrogen or hydrocarbon fuel, such as natural gas or methane) remaining in the exhaust.

Figure 5A:
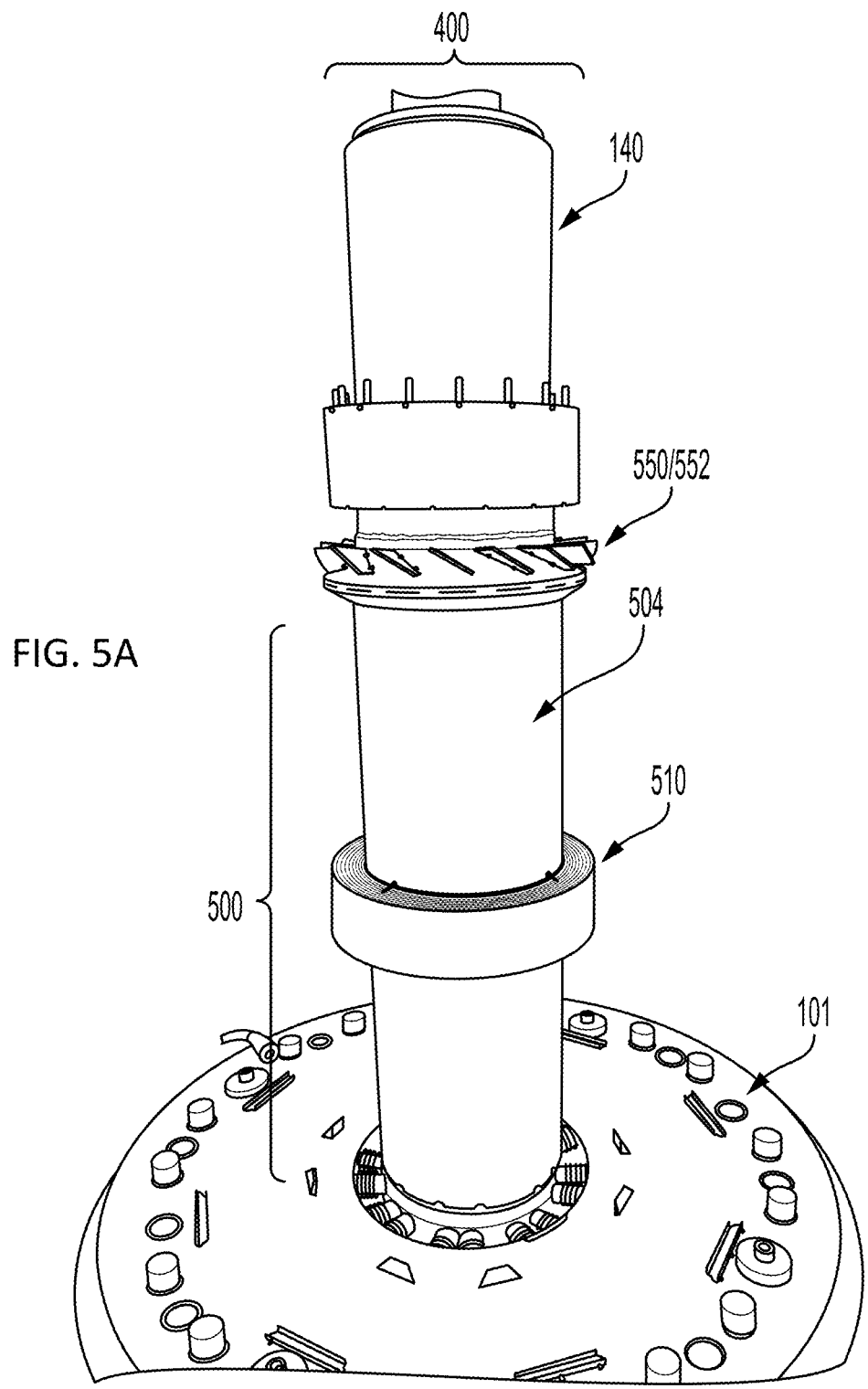
FIG. 5A is a photograph showing an exemplary central column 400, with the outer cylinder of the ATO removed.
Figure 5B:
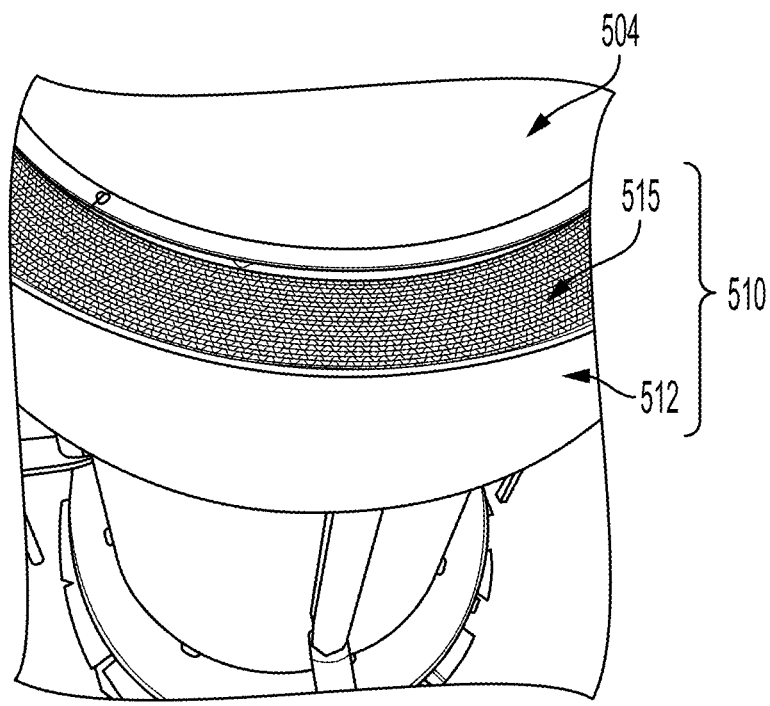
FIG. 5B is a photograph showing a top perspective view of the catalyst ring of the ATO.
Figure 5C:
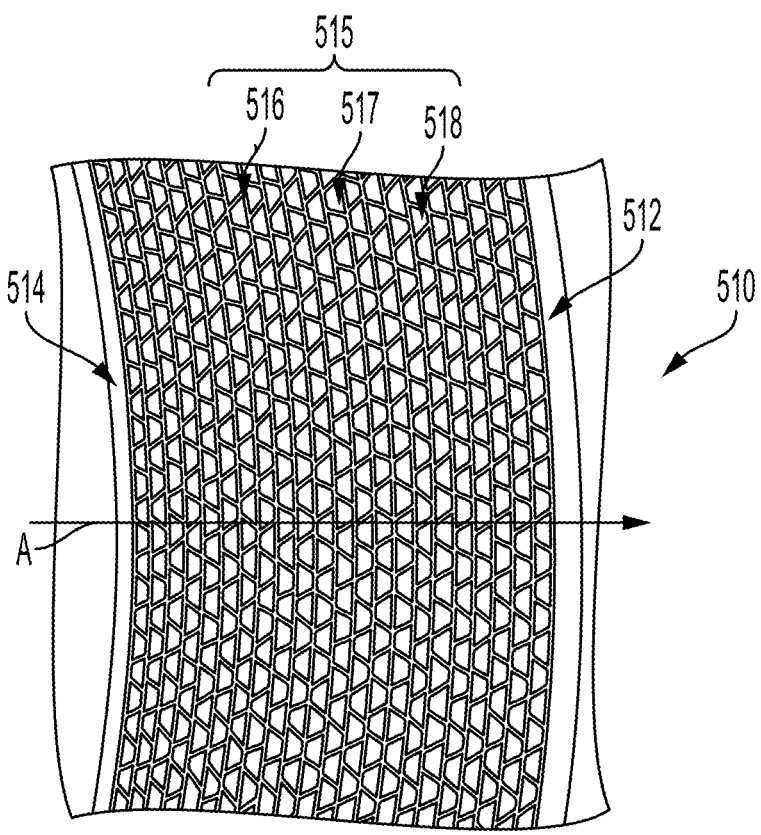
FIG. 5C is a photograph showing a close up view of the top surface of a portion of the catalyst ring, according to various embodiments of the present disclosure.

FIG. 5A is a photograph showing an exemplary central column 400, with the outer cylinder 502 of the ATO 500 removed, FIG. 5B is a photograph showing a top perspective view of the catalyst ring 510 of the ATO 500, and FIG. 5C is a photograph showing a close up view of the top surface of a portion of the catalyst ring 510, according to various embodiments of the present disclosure.

Referring to FIGS. 5A-5C, the catalyst ring 510 may include an outer wall 512, an inner wall 514, and a matrix 515 disposed there between. In some embodiments, the catalyst ring 510 may be formed of a high-temperature stable material, such as metals, for example stainless steel or Inconel (i.e., a high temperature nickel based alloy), or ceramic materials such as alumina, or the like. For example, the walls 512 may be metal and the matrix 515 may be ceramic coated with catalyst metal. In some embodiments, the outer wall 512 and the inner wall 514 may be cylindrical when viewed from the top. However other ring shapes, such as rectangular or hexagonal ring shapes may alternatively be used. The outer wall 512 may concentrically surrounding the inner wall 514. The inner wall 514 may be attached to the inner cylinder 504 of the ATO 500. The matrix 515 is attached to the inner wall 514 and the outer wall 512 by brazing or another suitable method.

The matrix 515 may have a honeycomb-type structure including channels 516. The channels 516 may have any shape, so long as the channels 516 are configured to permit a fluid to flow through the catalyst ring 510, from the top surface to an opposing bottom surface of the catalyst ring 510. For example, the channels 516 may be straight or curved. In some embodiments, the channels 516 may extend in a direction that is substantially perpendicular to a plane of the top surface and/or bottom surface of the catalyst ring 510.

In some embodiments, the channels 516 may be arranged in concentric rings surrounding the inner wall 514. For example, the channels 516 may be arranged in at least 3, such as at least 5, at least 10, or at least 15 concentric rings. In other embodiments, the channels 516 may be disposed in an irregular arrangement. For example, the channels 516 may have any arrangement, so long as at least 3, such as at least 5, at least 10, or at least 15 channels 516 are disposed in a radial (i.e., horizontal) direction A (see FIG. 5C), extending between the outer wall 512 and the inner wall 514. The radial direction A may be perpendicular to the axial (i.e., vertical) direction of fluid (i.e., fuel and air exhaust) flow through the catalyst ring 510.

In one embodiment shown in FIG. 5C, the matrix 515 may be formed from concentric cylindrical walls 517 (such as three or more concentric walls 517) separated from each other by cylindrical corrugated spacers 518. In some embodiments, the cylindrical walls 517, spacers 518, and/or the outer and inner walls 512, 514 may be attached to one another by, for example, brazing or welding. The channels 516 may have a trapezoidal horizontal cross sectional shape, with the short and long parallel trapezoid sides alternating in the angular (i.e., clockwise or counter-clockwise) direction when viewed from the top.

Figure 5D:
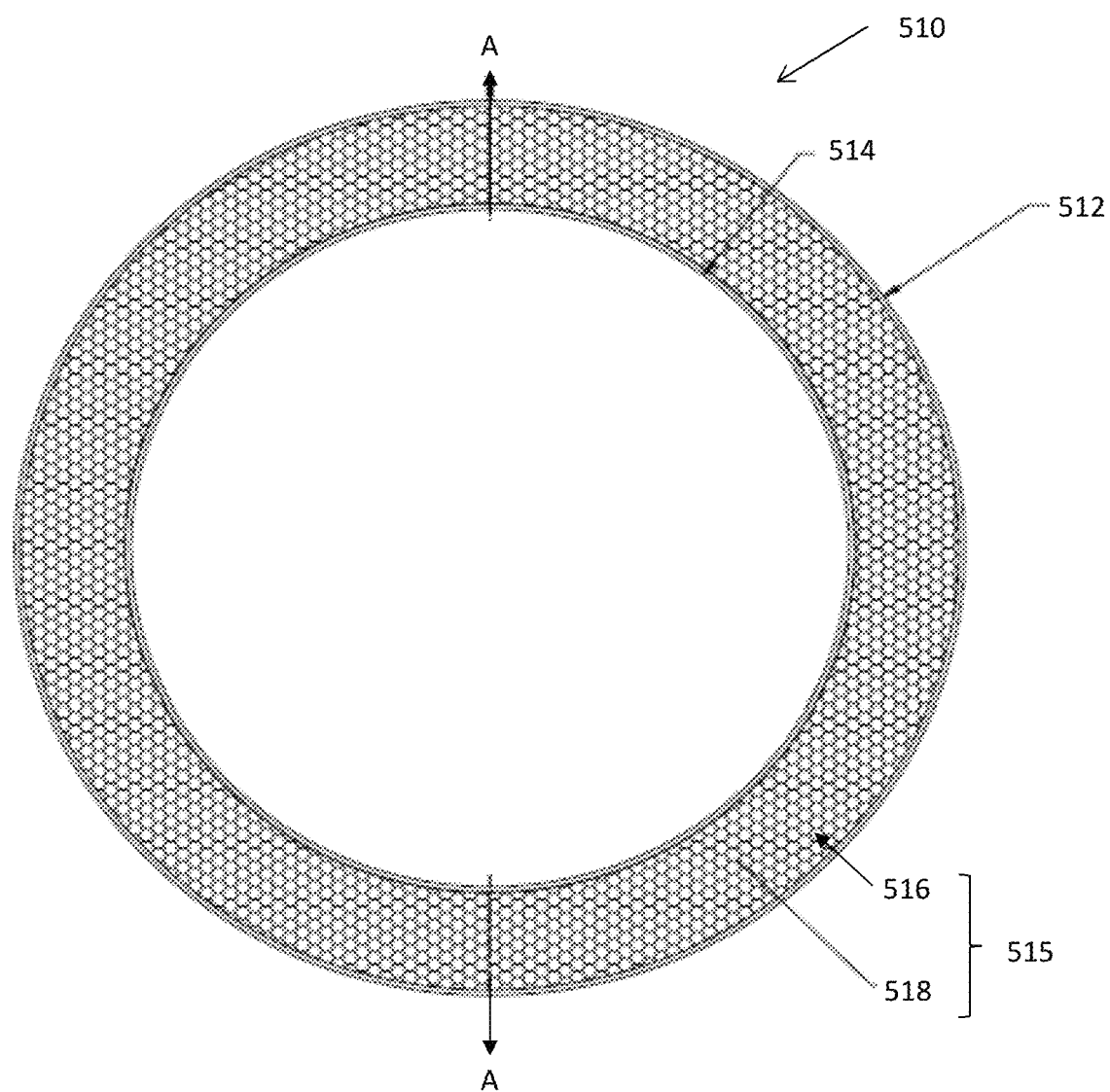
FIG. 5D is a top view according to an alternative catalyst ring, according to various embodiments of the present disclosure.

In an alternative embodiment shown in FIG. 5D, the cylindrical walls 517 may be omitted from the matrix 515. In this embodiment, the corrugated spacers 518 are attached to each other rather than to the pair of adjacent cylindrical walls 517. In this embodiment, the channels 516 may have a hexagonal horizontal cross sectional shape direction when viewed from the top. The channels 516 form a close-packed hexagonal array when viewed from the top.

The matrix 515 may be loaded (i.e., having the surfaces of the channels coated) with an oxidation catalyst. In particular, the honeycomb structure of the matrix 515 may provide a high surface area for catalyst loading. Suitable oxidation catalysts may be configured to catalyze the oxidation carbon monoxide into carbon dioxide and/or oxidize any fuel remaining in the exhaust. For example, suitable oxidation catalyst may include catalyst metals such as platinum (Pt), palladium (Pd), rhodium (Rh), iridium (Ir), osmium (Os), ruthenium (Ru), tantalum (Ta), nickel (Ni), copper (Cu), oxides thereof, alloys thereof, combinations thereof, or the like. In some embodiments, the oxidation catalyst may include palladium. The oxidation catalyst may be applied to the matrix 515 using any suitable process, such as by a washcoating process, for example.

Figure 6:
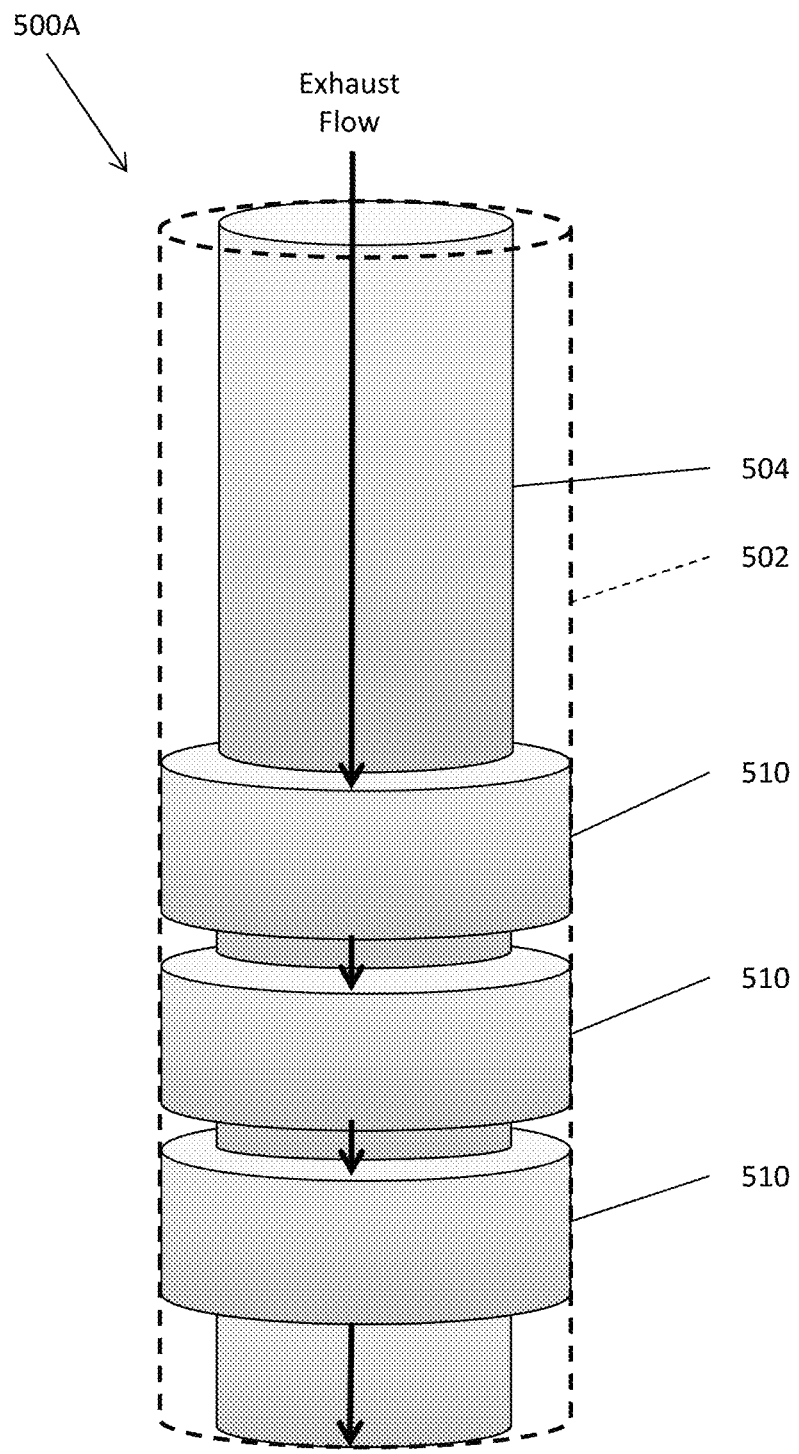
FIG. 6 is a perspective view of a modified ATO, according to various embodiments of the present disclosure.

FIG. 6 is a schematic view of an alternative ATO 500A, according to various embodiments of the present disclosure. The ATO 500A may be similar to the ATO 500. Accordingly, only the differences there between will be described in detail.

Referring to FIG. 6, the ATO 500A may include two or more catalyst rings 510. For example, the ATO 500A may include three catalyst rings 510 with the first ring located over the second ring, and the second ring located above the third ring, as shown in FIG. 6. However, the present disclosure is not limited to any particular number of catalyst rings 510. For example, the number of catalyst rings 510 may be selected based on the composition of exhaust the ATO 500A is configured to receive.

The catalyst rings 510 may be disposed between the outer cylinder 502 and the inner cylinder 504, such that exhaust flowing through the ATO 500A, (e.g., between the outer cylinder 502 and the inner cylinder 504) passes through each catalyst ring 510. In some embodiments, the catalyst rings 510 may be disposed in a lower portion of the ATO 500A, in order to permit non-catalyzed oxidation of the exhaust to be substantially complete, before the exhaust enters the catalyst rings 510. The catalyst rings 510 and may be spaced apart from one another in the axial (i.e. vertical) direction, as shown in FIG. 6, or may directly contact one another. For example, the catalyst rings 510 may be spaced apart from one another, in an exhaust flow direction as shown by the exhaust flow arrows in FIG. 6, by a distance ranging from 0 to about 10 cm, such as from 0.5 to 5 cm, or from 1 to 2 cm.

In some embodiments, the catalyst rings 510 may be loaded with the same oxidation catalyst and/or may each have the same amount of catalyst loading. In other embodiments, the catalyst rings 510 may include different catalysts and/or may have different catalyst loading amounts.

The present inventors have determined that an ATO including a catalyst ring, as described herein may provide various unexpected benefits, as compared to conventional ATO designs. For example, the catalyst ring may provide an increased surface area for catalyst loading, which may increase the active area for oxidation, as compared to conventional designs. In addition, the catalyst ring may have a longer service life and may be manufactured at a lower cost, as compared to conventional designs.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The invention claimed is:

1. An anode tail gas oxidizer (ATO), comprising:
an inner ATO wall;
an outer ATO wall; and
a first catalyst ring disposed in a chamber formed between the inner ATO wall and the outer ATO wall, the first catalyst ring comprising:
an inner wall that contacts the inner ATO wall;
an outer wall that contacts the outer ATO wall; and
a matrix that extends from the inner wall to the outer wall, the matrix comprising channels that are loaded with an oxidation catalyst and that extend from a top surface to an opposing bottom surface of the first catalyst ring.

2. The ATO of claim 1, wherein:
the ATO is configured to provide fluid flow through the chamber in an axial direction; and
the channels extend lengthwise in the axial direction.

3. The ATO of claim 1, wherein the matrix comprises:
concentric cylindrical walls; and
cylindrical corrugated spacers disposed between the walls.

4. The ATO of claim 3, wherein the cylindrical walls and the spacers are brazed to each other to form the matrix.

5. The ATO of claim 3, wherein the matrix comprises at least three of the concentric cylindrical walls which are separated by the cylindrical corrugated spacers.

6. The ATO of claim 3, wherein the channels are at least partially defined by the walls and the spacers.

7. The ATO of claim 6, wherein the channels have a trapezoidal horizontal cross sectional shape, with the short and long parallel trapezoid sides alternating in an angular direction.

8. The ATO of claim 1, wherein the channels have a hexagonal horizontal cross sectional shape.

9. The ATO of claim 1, wherein the matrix comprises at least ten of the channels in a radial direction perpendicular to an axial direction of fluid flow through the first catalyst ring.

10. The ATO of claim 1, wherein the matrix comprises alumina.

11. An anode tail gas oxidizer (ATO), comprising:
an inner ATO wall;
an outer ATO wall;
a first catalyst ring disposed in a chamber formed between the inner ATO wall and the outer ATO wall, the first catalyst ring comprising:
an inner wall;
an outer wall; and
a matrix disposed between the inner wall and the outer wall and loaded with an oxidation catalyst; and
a second catalyst ring disposed in the chamber below the first catalyst ring, the second catalyst ring comprising:
an inner wall;
an outer wall; and
a matrix disposed between the inner wall and the outer wall and loaded with an oxidation catalyst.

12. The ATO of claim 11, wherein the first and second catalyst ring directly contact each other or are spaced apart within the chamber.

13. The ATO of claim 11, further comprising a third catalyst ring disposed in the chamber below the second catalyst ring, the third catalyst ring comprising:
an inner wall;
an outer wall; and
a matrix disposed between the inner wall and the outer wall and loaded with an oxidation catalyst.

14. A fuel cell system comprising:
fuel cell stacks;
a central column; and
the ATO of claim 1 located between the fuel cell stacks and the central column.

15. The fuel cell system of claim 14, wherein:
the ATO is cylindrical and surrounds the central column; and
the fuel cell stacks surround the ATO.

16. The fuel cell system of claim 15, wherein the central column comprises:
an anode recuperator configured to heat fuel provided to the fuel cell stacks using anode exhaust output from the fuel cell stacks; and
an anode exhaust cooler configured to heat air provided to the fuel cell stacks using the anode exhaust output from and the anode recuperator.

17. The fuel cell system of claim 16, further comprising a splitter configured to provide a first portion of the anode exhaust output from the anode recuperator to the ATO, and to provide a second portion of the anode exhaust output from the anode recuperator to the anode exhaust cooler.

18. The fuel cell system of claim 17, further comprising a vortex generator containing vanes located above the splitter and configured to swirl cathode exhaust output from the fuel cell stacks into the first portion of the anode exhaust flowing from the splitter through the chamber toward the first catalyst ring.

19. The fuel cell system of claim 17, wherein the ATO surrounds the anode recuperator.

20. The fuel cell system of claim 17, wherein:
the cathode exhaust oxidizes a majority of the first portion of the anode exhaust in the chamber before the anode exhaust enters the first catalyst ring; and
the first catalyst ring is configured to oxidize a remaining part of the first portion of the anode exhaust.

21. A fuel cell system comprising:
fuel cell stacks;
a central column comprising an anode recuperator configured to heat fuel provided to the fuel cell stacks using anode exhaust output from the fuel cell stacks, and an anode exhaust cooler disposed configured to heat air provided to the fuel cell stacks using the anode exhaust output from and the anode recuperator;
an anode tail gas oxidizer (ATO), located between the fuel cell stacks and the central column;
a splitter configured to provide a first portion of the anode exhaust output from the anode recuperator to the ATO, and to provide a second portion of the anode exhaust output from the anode recuperator to the anode exhaust cooler; and
a vortex generator containing vanes located above the splitter;
wherein:
the ATO comprises:
an inner ATO wall;
an outer ATO wall;
a first catalyst ring disposed in a chamber formed between the inner ATO wall and the outer ATO wall, the first catalyst ring comprising:
an inner wall;
an outer wall; and
a matrix disposed between the inner wall and the outer wall and loaded with an oxidation catalyst; and
the vortex generator is configured to swirl cathode exhaust output from the fuel cell stacks into the first portion of the anode exhaust flowing from the splitter through the chamber toward the first catalyst ring.

* * * * *